United States Patent
de Ong

(10) Patent No.: US 9,398,766 B2
(45) Date of Patent: Jul. 26, 2016

(54) FLUID DISTRIBUTION ASSEMBLY

(71) Applicant: William de Ong, Forks, WA (US)

(72) Inventor: William de Ong, Forks, WA (US)

(\*) Notice: Subject to any disclaimer, the term of this patent is extended or adjusted under 35 U.S.C. 154(b) by 0 days.

(21) Appl. No.: 14/568,984

(22) Filed: Dec. 12, 2014

(65) Prior Publication Data

US 2016/0165873 A1 Jun. 16, 2016

(51) Int. Cl.
*A01M 21/04* (2006.01)
*A01M 21/00* (2006.01)
*A01M 7/00* (2006.01)
*B05B 9/04* (2006.01)
*B05B 9/00* (2006.01)

(52) U.S. Cl.
CPC ............ *A01M 7/0042* (2013.01); *A01M 21/043* (2013.01); *B05B 9/002* (2013.01); *B05B 9/0426* (2013.01)

(58) Field of Classification Search
CPC ............ A01M 7/0042; A01M 7/0053; A01M 7/0075; A01M 21/00; A01M 21/04; A01M 21/043; B05B 9/002; B05B 9/0426
See application file for complete search history.

(56) References Cited

U.S. PATENT DOCUMENTS

| | | | |
|---|---|---|---|
| 1,804,592 A | 5/1931 | Chase | |
| 2,987,259 A | 6/1961 | Lindquist | |
| 5,028,017 A | 7/1991 | Simmons et al. | |
| D344,737 S | 3/1994 | Long et al. | |
| 5,385,106 A | 1/1995 | Langshaw | |
| 6,047,900 A | 4/2000 | Newson et al. | |
| 7,100,540 B2 | 9/2006 | Vaughan | |
| 2004/0074114 A1* | 4/2004 | Rogers | E01H 5/106 37/228 |
| 2012/0216445 A1* | 8/2012 | Aquilina | A01M 7/0042 43/132.1 |

FOREIGN PATENT DOCUMENTS

| IT | EP 1695620 A1 * | 8/2006 | ............ A01M 21/04 |
|---|---|---|---|
| WO | WO9902033 | 1/1999 | |

\* cited by examiner

*Primary Examiner* — Darren W Gorman

(57) ABSTRACT

A fluid distribution assembly includes a vehicle that has a tank coupled thereto. The tank may contain a fluid. A control circuit is coupled to the vehicle. The control circuit is electrically coupled to a power source. A heating element is in thermal communication with the tank to heat the fluid to a temperature greater than 185° Fahrenheit. The heating element comprises a plurality coils distributed along the tank. The heating element is electrically coupled to the control circuit. A pump is coupled to the vehicle. The pump is in fluid communication with the tank to urge the fluid out of the tank. The pump is electrically coupled to the control circuit. A fluid dispensing unit is in fluid communication with the pump and the tank.

4 Claims, 3 Drawing Sheets

FLUID DISTRIBUTION ASSEMBLY

BACKGROUND OF THE DISCLOSURE

Field of the Disclosure

The disclosure relates to distribution devices and more particularly pertains to a new distribution device for distributing a heated fluid onto weeds thereby killing the weeds.

SUMMARY OF THE DISCLOSURE

An embodiment of the disclosure meets the needs presented above by generally comprising a vehicle that has a tank coupled thereto. The tank may contain a fluid. A control circuit is coupled to the vehicle. The control circuit is electrically coupled to a power source. A heating element is in thermal communication with the tank to heat the fluid to a temperature greater than 185° Fahrenheit. The heating element comprises a plurality coils distributed along the tank. The heating element is electrically coupled to the control circuit. A pump is coupled to the vehicle. The pump is in fluid communication with the tank to urge the fluid out of the tank. The pump is electrically coupled to the control circuit. A fluid dispensing unit is in fluid communication with the pump and the tank.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
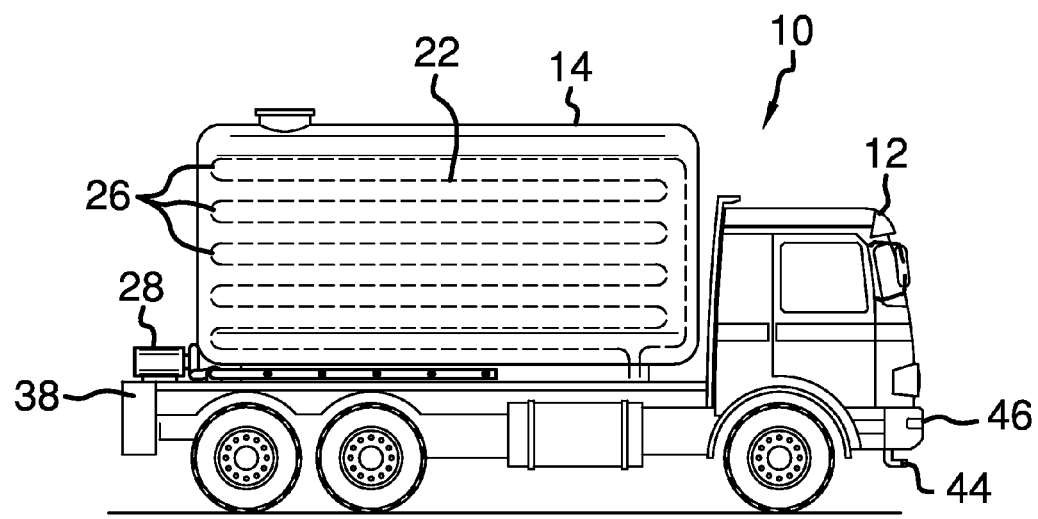
FIG. 1 is a right side view of a fluid distribution assembly according to an embodiment of the disclosure.
Figure 2:
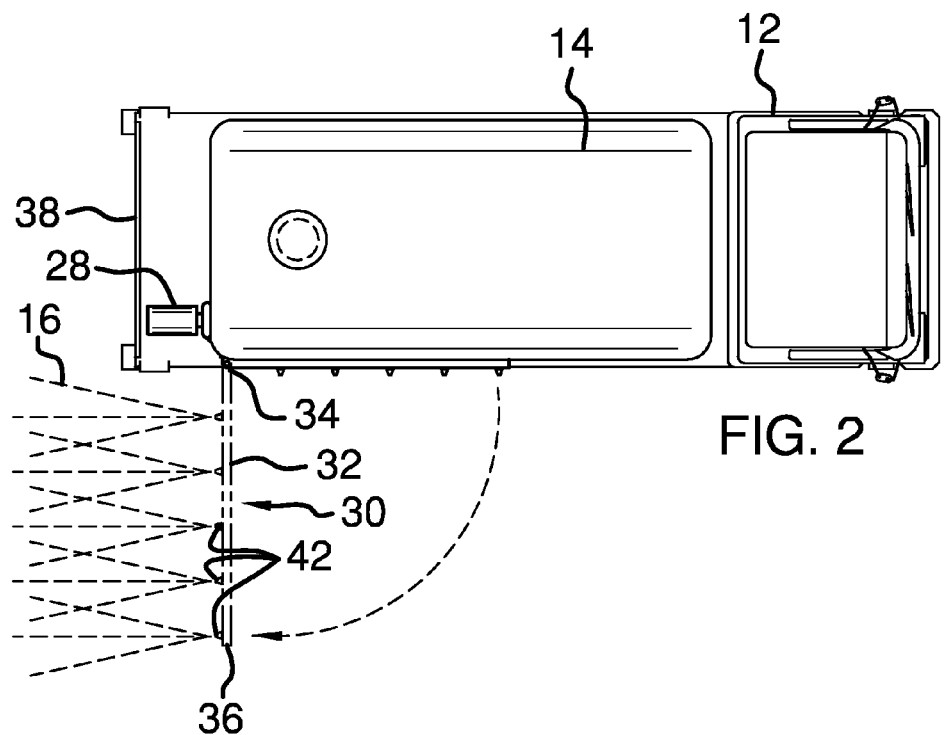
FIG. 2 is a top view of an embodiment of the disclosure.
Figure 3:
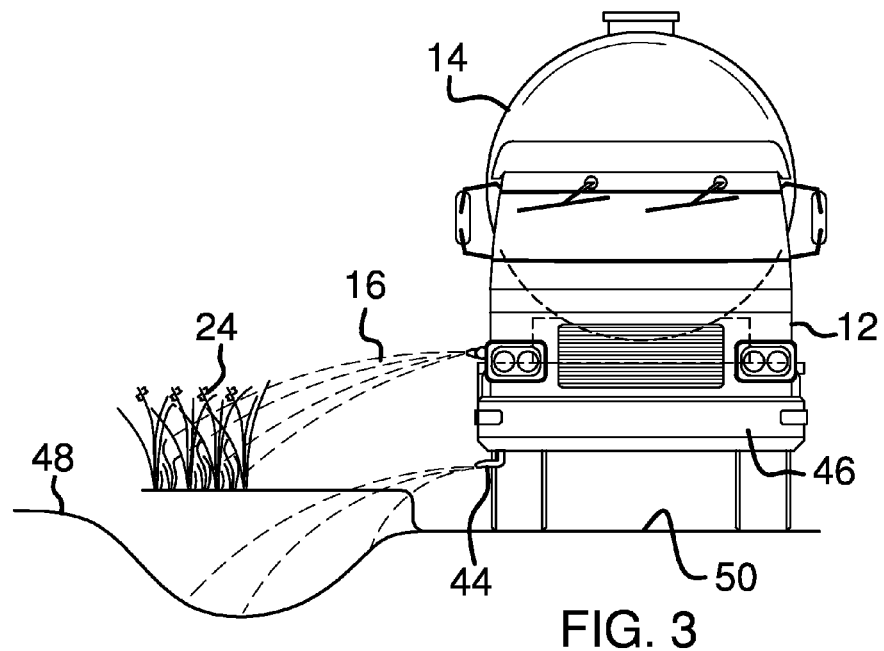
FIG. 3 is a front view of an embodiment of the disclosure.
Figure 4:
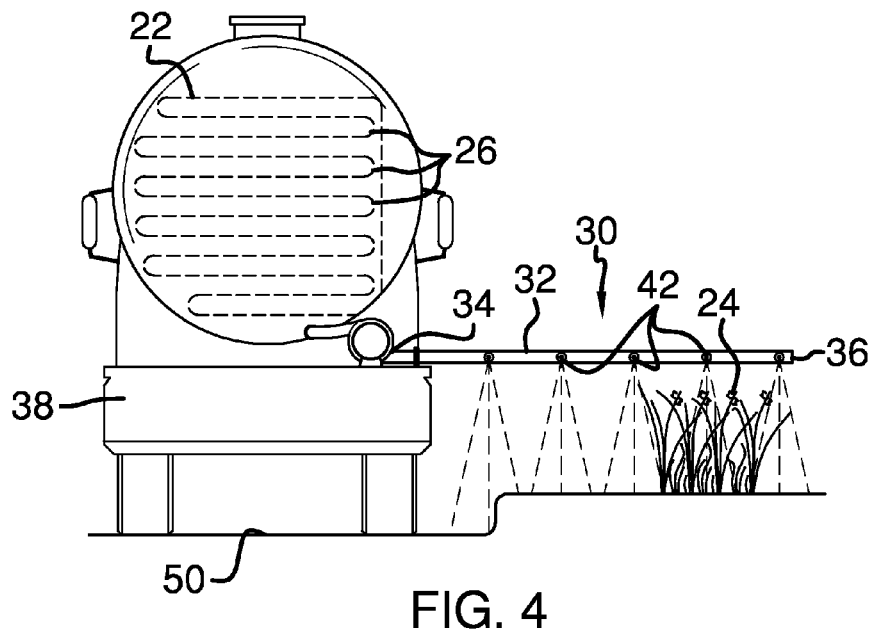
FIG. 4 is a back view of an embodiment of the disclosure.
Figure 5:
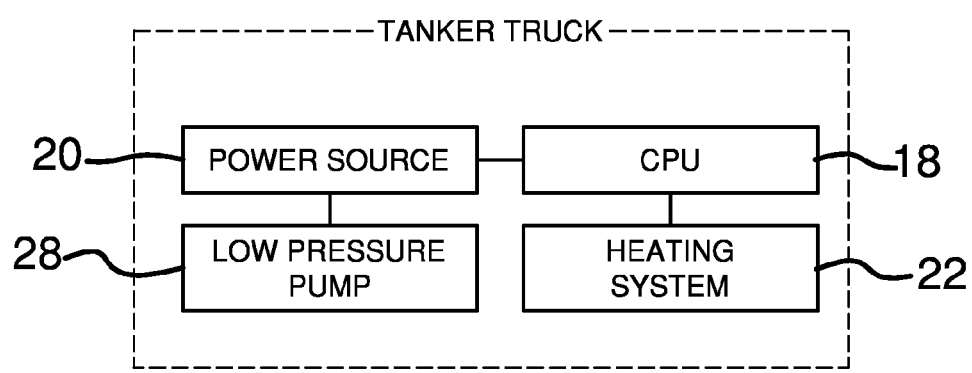
FIG. 5 is a schematic view of an embodiment of the disclosure.

With reference now to the drawings, and in particular to FIGS. 1 through 5 thereof, a new distribution device embodying the principles and concepts of an embodiment of the disclosure and generally designated by the reference numeral 10 will be described.

As best illustrated in FIGS. 1 through 5, the fluid distribution assembly 10 generally comprises a vehicle 12 that has a tank 14 coupled thereto. The tank 14 contains a fluid 16. The fluid 16 may be water. The vehicle 12 may be a truck of any conventional design.

A control circuit 18 is coupled to the vehicle 12. The control circuit 18 is electrically coupled to a power source 20. The power source 20 may be an electrical system of the vehicle 12. Additionally, the power source 20 may be a generator positioned on the vehicle.

A heating element 22 is in thermal communication with the tank 14. The heating element 22 may heat the fluid 16 to a temperature greater than 185° Fahrenheit. The temperature of the fluid 16 is heated to at least 200° Fahrenheit in order to kill weeds 24. The heating element 22 comprises a plurality of coils 26 that are distributed along the tank 14. The heating element 22 is electrically coupled to the control circuit 18.

A pump 28 is coupled to the vehicle 12. The pump 28 is in fluid communication with the tank to urge the fluid 16 out of the tank 14. The pump 28 is electrically coupled to the control circuit 18. The pump 28 may be a fluid pump of any conventional design.

A fluid dispensing unit 30 is in fluid communication with the pump 28 and the tank 14. The fluid dispensing unit 30 comprises a spray bar 32 that has a first end 34 and a second end 36. The spray bar 32 is elongated. The first end 34 is pivotally coupled to the vehicle 12. The spray bar 32 is positioned adjacent to a back 38 of the vehicle 12. Thus, the spray bar 32 is positionable over weeds 24 located a lateral distance away from the vehicle 12. The spray bar 32 is in fluid communication with the tank 14.

A plurality of nozzles 42 is fluidly coupled to the spray bar 32. The nozzles 42 spray the fluid 16 onto the weeds 24. The nozzles 42 are evenly distributed along the spray bar 32. A tube 44 is coupled to and extends laterally away from the vehicle 12. The tube 44 is positioned adjacent to a front 46 of the vehicle 12. The tube 44 is in fluid communication with the tank 14 to spray the fluid 16 onto the weeds 24 located directly adjacent to the vehicle 12.

In use, the spray bar 32 is positioned to extend laterally away from the vehicle 12. The pump 28 is actuated and the fluid 16 is sprayed on the weeds 24. The heated fluid 16 presents a non toxic means of killing weeds 24. The weeds 24 may be located in a ditch 48 positioned adjacent to a roadway 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fluid distribution assembly configured to distribute a heated fluid onto weeds thereby killing the weeds, said assembly comprising:

a vehicle having a tank coupled thereto, said tank being configured to contain a fluid;

a control circuit coupled to said vehicle, said control circuit being electrically coupled to a power source;

a heating element being in thermal communication with said tank such that said heating element is configured to heat the fluid to a temperature greater than 185° Fahrenheit, said heating element comprising a plurality of coils being distributed along said tank, said heating element being electrically coupled to said control circuit;

a pump coupled to said vehicle, said pump being in fluid communication with said tank wherein said pump is configured to urge the fluid out of said tank, said pump being electrically coupled to said control circuit; and a fluid dispensing unit being in fluid communication with said pump and said tank, said fluid dispensing unit comprising a spray bar having a first end and a second end, said spray bar being straight and elongated, said first end being pivotally coupled to said vehicle proximate a back of said vehicle such that said second end of said spray bar is configured to be positionable alternatively adjacent to said vehicle such that said spray bar is positioned parallel to a lateral side of said vehicle extending from said back of said vehicle towards a front of said vehicle and pivoted to extend laterally from said back of said vehicle over weeds located a lateral distance away from said vehicle and adjacent to said back of said vehicle, said spray bar being in fluid communication with said tank.

2. The assembly according to claim 1, further comprising a plurality of nozzles fluidly coupled to said spray bar such that said nozzles are configured to spray the fluid onto the weeds, said nozzles being evenly distributed along said spray bar.

3. The assembly according to claim 1, further comprising a tube coupled to and extending laterally away from said vehicle, said tube being positioned proximate a front of said vehicle, said tube being in fluid communication with said tank such that said tube is configured to spray the fluid onto the weeds located directly adjacent to said front of said vehicle.

4. A fluid distribution assembly configured to distribute a heated fluid onto weeds thereby killing the weeds, said assembly comprising:

a vehicle having a tank coupled thereto, said tank being configured to contain a fluid;

a control circuit coupled to said vehicle, said control circuit being electrically coupled to a power source;

a heating element being in thermal communication with said tank such that said heating element is configured to heat the fluid to a temperature greater than 185° Fahrenheit, said heating element comprising a plurality of coils being distributed along said tank, said heating element being electrically coupled to said control circuit;

a pump coupled to said vehicle, said pump being in fluid communication with said tank wherein said pump is configured to urge the fluid out of said tank, said pump being electrically coupled to said control circuit;

a fluid dispensing unit being in fluid communication with said pump and said tank, said fluid dispensing unit comprising:

a spray bar having a first end and a second end, said spray bar being straight and elongated, said first end being pivotally coupled to said vehicle proximate a back of said vehicle such that said second end of said spray bar is configured to be positionable alternatively adjacent to said vehicle such that said spray bar is positioned parallel to a lateral side of said vehicle extending from said back of said vehicle towards a front of said vehicle and pivoted to extend laterally from said back of said vehicle over weeds located a lateral distance away from said vehicle and adjacent to said back of said vehicle, said spray bar being in fluid communication with said tank;

a plurality of nozzles fluidly coupled to said spray bar such that said nozzles are configured to spray the fluid onto the weeds, said nozzles being evenly distributed along said spray bar; and a tube coupled to and extending laterally away from said vehicle, said tube being in fluid communication with said tank such that said tube is configured to spray the fluid onto the weeds located directly adjacent to said vehicle.

\* \* \* \* \*